Dec. 17, 1929.                H. CHITTY                  1,740,002
                            TROLLING RAFT
                        Filed May 18, 1929          4 Sheets-Sheet 1
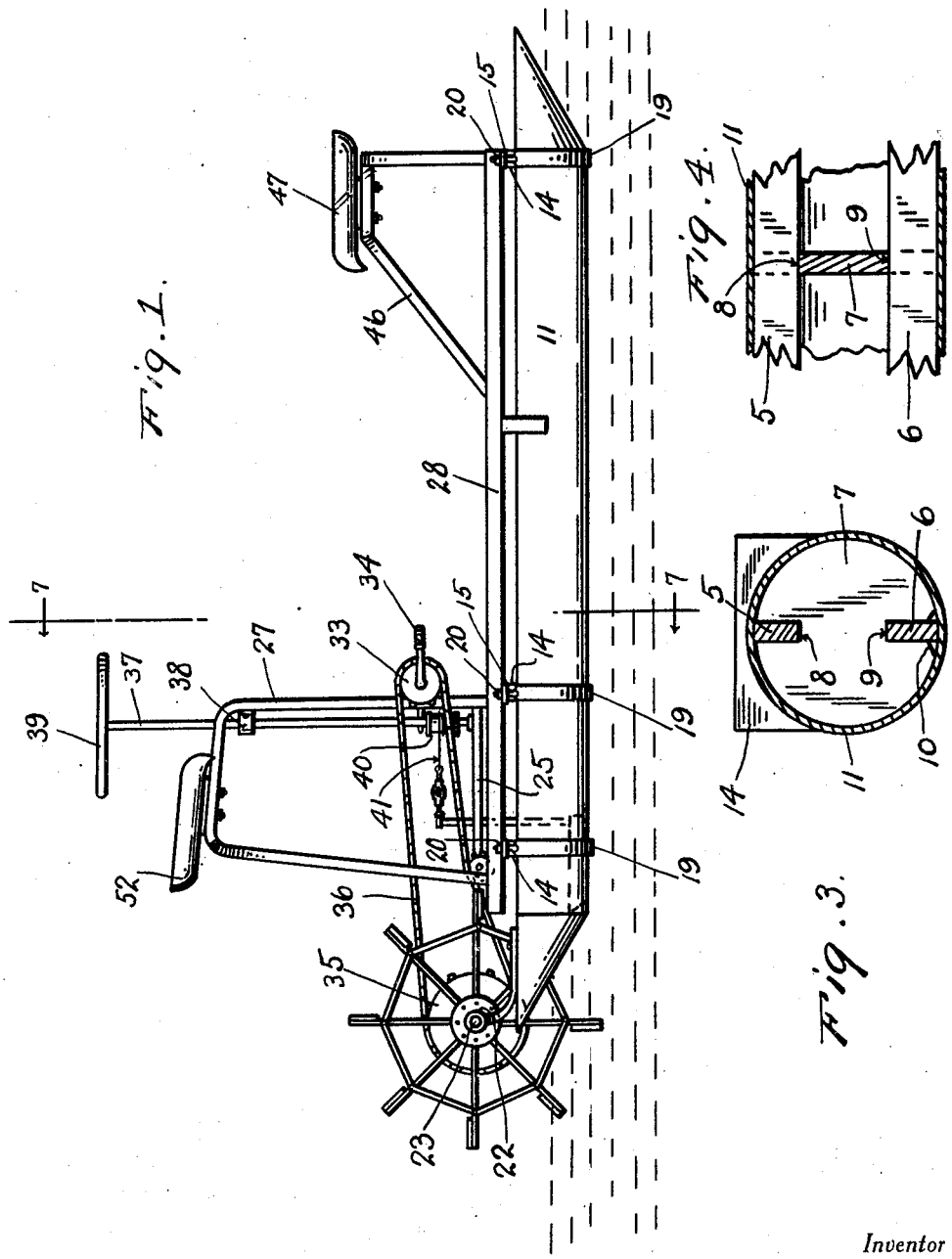
Inventor
*Howard Chitty*
By *Clarence A. O'Brien*
                                                        Attorney

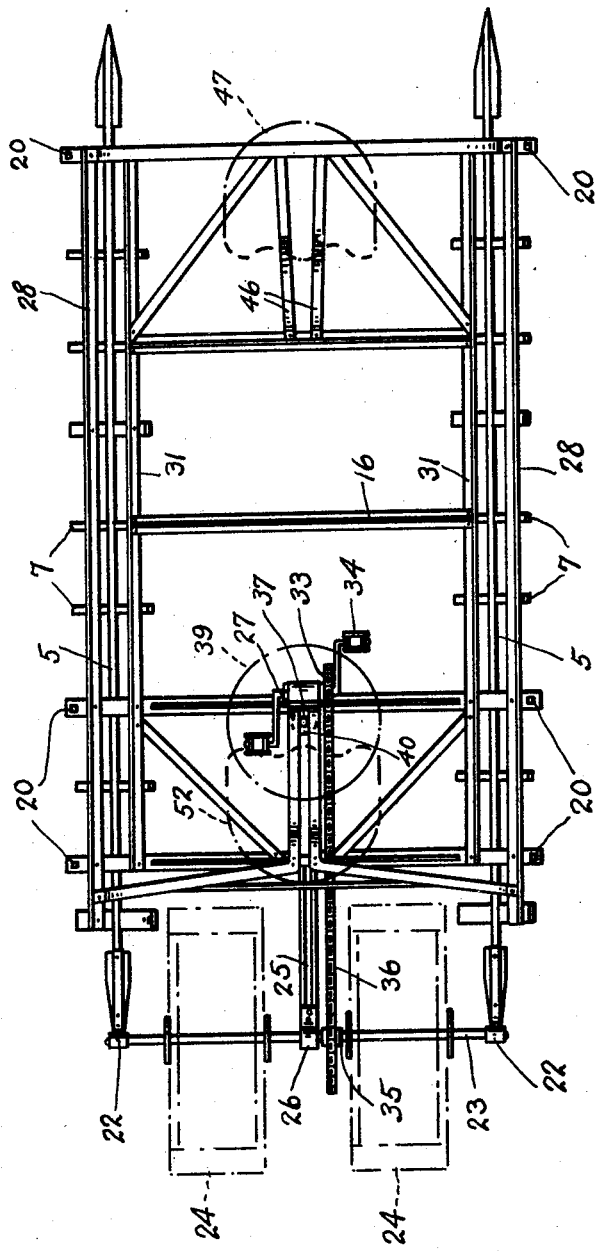

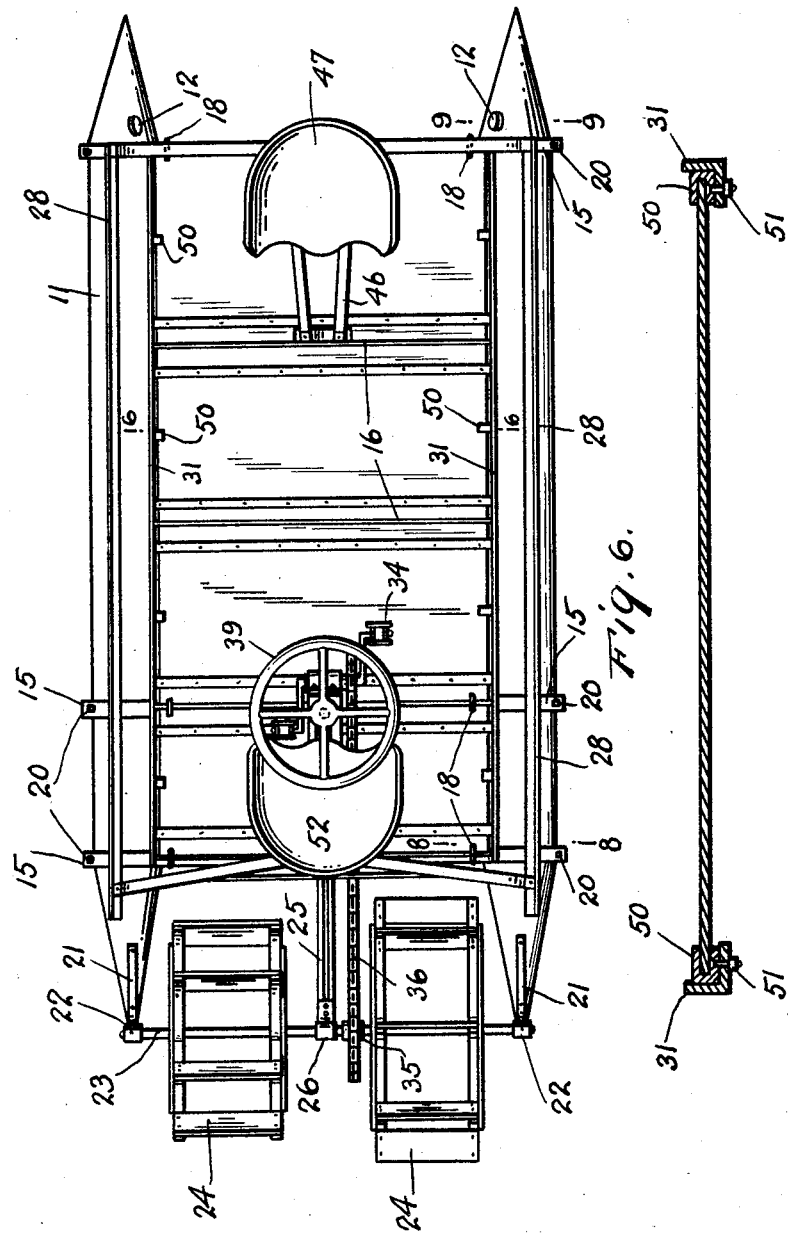

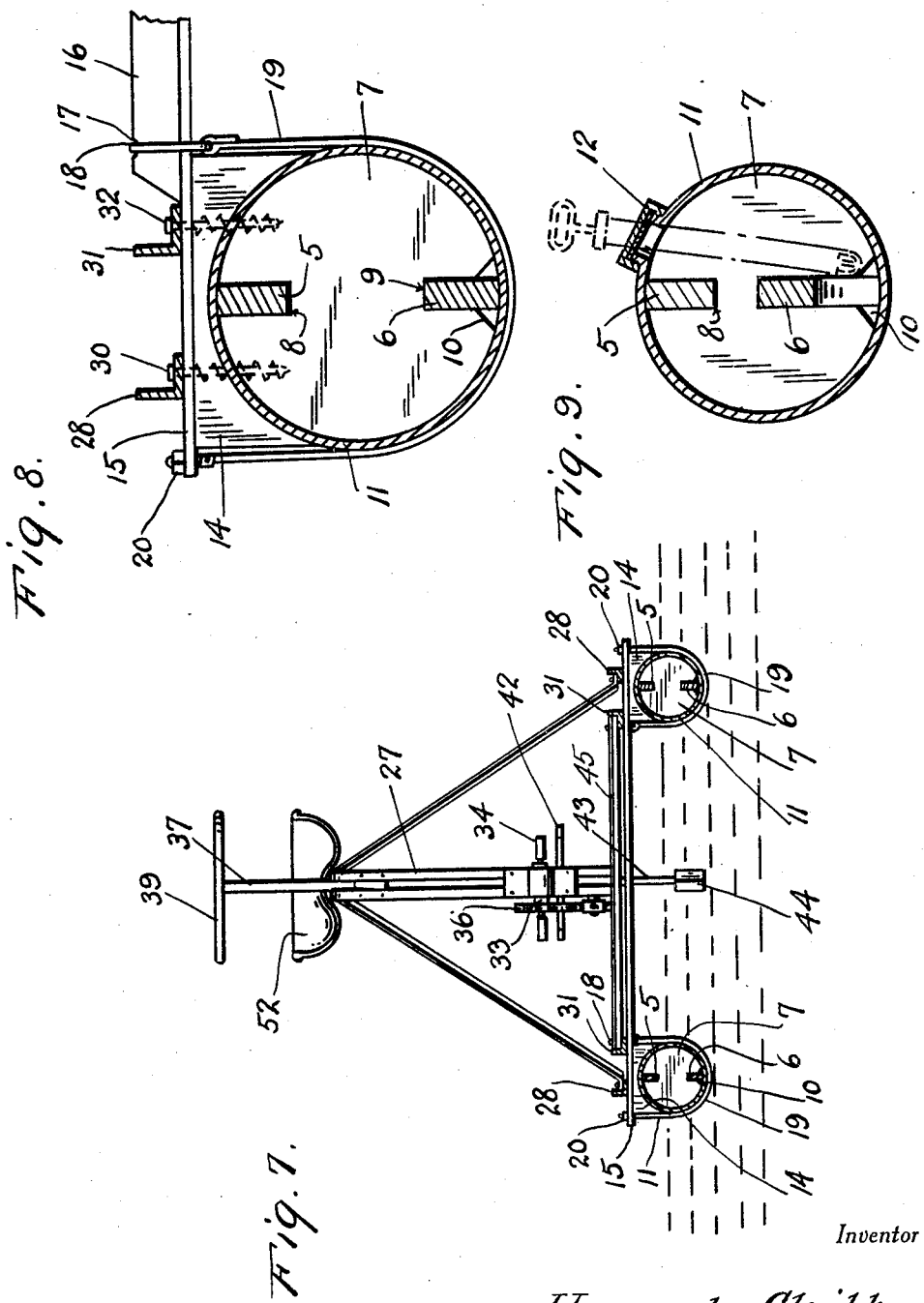

Patented Dec. 17, 1929

1,740,002

UNITED STATES PATENT OFFICE

HOWARD CHITTY, OF MITCHELL, INDIANA

TROLLING RAFT

Application filed May 18, 1929. Serial No. 364,045.

The present invention relates to a trolling raft and has for its prime object to provide a device of this nature which is foot propelled. In troll fishing it is necessary to keep moving slowly at all times, and such States as have law prohibiting fishing with a motor driven boat, there is the common practice to troll fish by rowing a pair of oars but the present structure makes propulsion easier than this common practice and more convenient.

This pontoon fishing raft or boat is also very convenient in bathing, still fishing or long vacation voyages down rivers from source to mouth. If preferable to construct decking on this raft of sufficient length and width to accommodate a small pup tent and cots and being constructed of air tight pontoons or tubes is practically non-sinkable in any ordinary waters, such as rivers and inland lakes. It would also be valuable for use in swamp or shallow water, as it draws practically only a few inches and will travel in very shallow water.

Another very important object of the invention resides in the provision of a trolling raft of this nature which is simple in construction, inexpensive to manufacture, having its parts arranged so as to be easily and quickly assembled and disassembled, and otherwise efficient and reliable in use and operation.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the raft embodying the features of my invention, Figure 2 is a top plan view thereof, Figure 3 is a detail transverse section through one of the pontoons, Figure 4 is a fragmentary longitudinal section therethrough, Figure 5 is a top plan view of the raft showing the propellers and pontoons in place.

Figure 6 is a section taken substantially on the line 6—6 of Figure 5,

Figure 7 is a vertical transverse section taken substantially on the line 7—7 of Figure 1, Figure 8 is a sectional view taken substantially on the line 8—8 of Figure 5, and Figure 9 is a sectional view taken substantially on the line 9—9 of Figure 5.

This raft is constructed of two or more pontoons. The pontoons may be made of any length and any diameter desired and may be placed any distance apart. Each pontoon is reinforced with a framework of wood. This reinforcing consists of a ridge board 5 and a base board 6, the ridge board being continuous from the stem to the stern while the base board is shortened the extent of the rake at each end of the pontoon.

A plurality of wooden disks 7 join the ridge board and base board being notched as at 8 and 9 to receive the same and the notch 9 at its bottom is widened as at 10.

The casing 11 of the pontoon is disposed about the frame work and is beveled upwardly at the end to provide the desired rake. At one end the casing is provided with an opening having a cap 12 threaded thereover so that a pump is placed in the opening so that the water in the pontoon may be pumped out, said water reaching the end where the pump is located because of the widened lower end of the notches 9.

The block 14 rests on the pontoon above each disk 7. Cross rods 15 rest on the block and extend between the pontoons. Ribs 16 are formed on the rods 15 and terminate different distances from the ends thereof. In the ends of the ribs are notches 17 in which is seated a ring 18.

U-bolts 19 have ends engaged with the rings and extend under the pontoons and through the extremities of the cross rods 15 and said latter ends are threaded to receive nuts 20.

On the rear end of the pontoon are brackets 21 terminating at their rear ends to bearings 22 to receive a shaft 23 on which is a pair of paddle wheels 24. The center bracket 25 extends rearwardly from the rearmost connecting rod and has a bearing at the rear end 26 fixed to the shaft.

A frame 27 rises from the rear portion of the raft with means afforded on longitudinal angle bars 28 engaged on the end portions of the connecting rod 26 and to the block portions by means of screws 30.

The front ends 27 are secured to one of the intermediate connecting rods 15. Other angle bars 31 are anchored to the ends of the rods 15 and the blocks 14 by screws 32. A sprocket 33 with pedals 34 is journaled on the forward portion of the frame 27 as at 38 and a sprocket 35 is mounted on the shaft 23 and a chain 36 is trained over these sprockets. A vertical shaft 37 is journaled on the frame 27 and has a steering wheel 39 at its upper end and a drum 40 at its lower portion with a cable 41 windable thereabout and having its end connected to the cross rod 42 at the upper end of the shaft 43 of the rudder 44.

The decking plates 45 are mounted between the angle bars 31 and between the cross rods 15. The shaft 43 is journaled through the rearmost deck plate.

A seat 46 rises from the front of the raft to support a seat 47. The decking plates are held in place by grooved blocks 50 as clearly illustrated in Figure 6 and these blocks are anchored to the angle bars 31 as at 51.

From the above detailed description it will be seen that a person on the seat 52 on the frame 57 may propel the raft along with ease and steer the same so that the trolling may be accomplished at the desired speed.

It is thought that the construction, utility and advantages of this invention will now be fully appreciated by those skilled in this art without any more detail description thereof.

The present embodiment of the invention has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a raft of the class described, a pair of pontoons, blocks on the pontoons, cross rods resting on said blocks, U-bolts holding said cross rods and the blocks assembled on the pontoons, each pontoon including a tube having a ridge board and a base board extending longitudinally thereof and a plurality of disks with notches to receive the boards, said disks extending transversely of the tubes one under each block.

2. In a raft of the class described, a pair of pontoons, blocks on the pontoons, cross rods resting on said blocks, U-bolts holding said cross rods and the blocks assembled on the pontoons, each pontoon including a tube having a ridge board and a base board extending longitudinally thereof and a plurality of disks with notches to receive the boards, said disks extending transversely of the tubes one under each block, the lower notches being wider at their lower ends so that the pontoons may be tilted to allow any water therein to drain down at one end, said one end being provided with a capped opening so that a pump may be placed therein.

3. In a raft of the class described, a pair of pontoons, blocks on the pontoons, cross rods resting on said blocks, U-bolts holding said cross rods and the blocks assembled on the pontoons, longitudinal bars on the ends of the cross rods above the pontoons, and decking mounted between the inner longitudinal bars, arms extending rearwardly from the pontoons and terminating in bearings, a shaft journaled in said bearings, paddle wheels on said shaft, a frame rising from the rear cross rods, pedals, chain and sprocket mechanism connecting the pedals with the shaft.

4. In a raft of the class described, a pair of pontoons, blocks on the pontoons, cross rods resting on said blocks, U-bolts holding said cross rods and the blocks assembled on the pontoons, longitudinal bars on the ends of the cross rods above the pontoons, and decking mounted between the inner longitudinal bars, arms extending rearwardly from the pontoons and terminating in bearings, a shaft journaled in said bearings, paddle wheels on said shaft, a frame rising from the rear cross rods, pedals, chain and sprocket mechanism connecting the pedals with the shaft, a rudder having a shaft rising through the decking and journaled therein, a seat supported on the frame, means on the rudder shaft and adjacent the seat for turning said rudder shaft.

In testimony whereof I affix my signature.

HOWARD CHITTY.